United States Patent Office 3,649,441
Patented Mar. 14, 1972

3,649,441
BLENDS OF OLEFIN POLYMERS HAVING IMPROVED STRESS CRACK RESISTANCE
Carl P. Strange and Gordon Y. T. Liu, Baton Rouge, La., assignors to The Dow Chemical Company, Midland, Mich.
No Drawing. Filed Aug. 28, 1968, Ser. No. 755,829
Int. Cl. H01b 7/00
U.S. Cl. 161—175                                5 Claims

ABSTRACT OF THE DISCLOSURE

An electrical conductor jacketing material having improved thermal stress crack resistance, environmental stress crack resistance, and abrasion resistance, said jacketing material comprising a high density blend of a high density, high molecular weight polyethylene and a copolymeric constituent containing as an essential ingredient a block copolymer of polyethylene and a polymer of butene-1.

BACKGROUND OF THE INVENTION

This invention relates to electrical conductor jacketing materials having improved stress crack resistance, and more particularly, to jacketing materials which are high density blends of high density, high molecular weight polyethylene and a copolymeric constituent containing as an essential ingredient a block copolymer of polyethylene and a polymer of butene-1.

The use of high density, high molecular weight polyethylene as an electrical conductor jacketing material has been known for some time. This type of polyethylene is well known for its high temperature resistance and its abrasion resistance in addition to its excellent insulative properties.

While the high density, high molecular weight polyethylenes are usually more resistant to environmental stress cracking than the high density, low molecular weight polyethylenes, articles or coatings produced from the high molecular weight polyethylenes contain increased internal strains resulting from normal forming operations such as extrusion and subsequent machining operations. This increase of internal strain of the high molecular weight polyethylene article over the low molecular weight polyethylene articles is caused by the poorer extrudability of the higher melting, high molecular weight polymer. These increased internal strains in themselves are often sufficient to cause the polymeric material to crack and rupture without being subjected to environmental stress. Generally, however, cracking and rupturing most often occur when the polymer is subjected to stress. For example, a cable jacketing is often coated with stress crack promoting detergents or other such agents to facilitate pulling the cable through an electrical conduit. Of course as the cable is pulled through the conduit, the jacketing is subjected to other stresses resulting from scraping the walls of the conduit and bending the cable.

In order to minimize these internal strains it is necessary to add to the high melting, high molecular weight polymer a more extrudable material, usually a lower molecular weight polymer or a lower molecular weight copolymer. However, since abrasion resistance of a polymer is directly related to the density and molecular weight of the polymer, i.e., the higher the density and molecular weight the better the abrasion resistance, the abrasion resistance of these blends of a high density, high molecular weight polyethylene with a less dense, lower molecular weight polymer or copolymer is correspondingly decreased as more of the less dense polymer is added.

In light of the fact that electrical cables are often exposed to both stress cracking and abrasive forces, it would be highly desirable to provide a jacketing blend which has the high temperature resistance, the abrasion resistance and strength of a high density, high molecular weight polyethylene in addition to the extrudability of a low molecular weight ethylene polymer.

SUMMARY OF THE INVENTION

Accordingly, it is an object of this invention to provide an improved jacketing blend capable of withstanding both stress cracking and abrasive forces. It is also an object to provide a jacketing blend which is easily extruded onto a metallic conductor or cable core. Other objects of this invention will become apparent in the following summary and detailed description of the preferred embodiments.

The present invention, in which the aforementioned objects are attained, is an improved electrical conductor jacketing blend, said jacketing blend comprising (1) from about 60 weight percent to about 95 weight percent of a high density, high molecular weight polyethylene and (2) from about 5 weight percent to about 40 weight percent of a copolymeric constituent containing as an essential ingredient a block copolymer of (a) polyethylene and (b) a polymer of butene-1, said copolymeric constituent having from about 60 weight percent to about 99.75 weight percent of polymerized ethylene and from about 0.25 weight percent to about 40 weight percent of polymerized butene-1.

Surprisingly, the jacketing blend of this invention has better resistance to both thermal and environmental stress cracking conditions than high density, high molecular weight polyethylene, yet this novel blend retains the good abrasion resistance of a high density, high molecular weight polyethylene. This novel jacketing blend also satisfies all of the standards set by the Rural Electrification Administration in REA Specification for Polyethylene Raw Material, PE-200 (March 1965).

While it is contemplated that the blends of this invention will be utilized primarily as jacketing and/or insulating materials for electrical conductors, these blends may also be used as protective coatings for metal, glass and wood substrates. Additionally they may be used as base materials in the fabrication of bottles and other shaped articles.

Description of the Preferred Embodiments

This invention requires a high density, high molecular weight polyethylene as a major component and as a minor component a copolymeric constituent comprising a block copolymer of (a) polyethylene and (b) a polymer of butene-1.

The high molecular weight polyethylene component has a density in the range of from about 0.96 to about 0.98 and a melt index, as determined by ASTM D-1238-65T (E), in the range of from about 0.1 decigram/minute to about 10 decigrams/minute, preferably from about 0.8 to about 4.5 decigrams/minute. Polyethylenes suitable for use in this invention are prepared by polymerizing ethylene under conditions normally used in a heterogeneous catalyst system, e.g., as described in U.S. Pats. 3,113,115 and 3,257,332 of Karl Ziegler et al.

The copolymeric constituent used as the minor component of the invention has a density in the range of from about 0.92 to about 0.93 and a melt flow viscosity, as determined by ASTM D-1238-65T(E), in the range of from about 0.005 decigram/minute to about 0.4 decigram/ minute. Butene-1 may be present in the copolymeric constituent in concentrations up to about 40 weight percent based on the constituent, with preferred concentrations being from about 0.25 to about 1 weight percent. The copolymeric constituent has an essential ingredient a block copolymer of polyethylene and a polymer of butene-1. "Polymer of butene-1" (as a block segment of the block copolymers of polyethylene and poly(butene-1), and the copolymers of butene-1 and other alpha-olefins, e.g., ethylene, propylene, hexene-1 and the like. Examples of block copolymers suitably employed as the essential ingredient of the copolymeric constituent include the block copolymers of polyethlene and poly(butene-1), polyethylene and ethylene/butene-1 copolymer, and the like.

In addition to the block copolymer, the copolymeric constituent optionally contains other polymer such as poly-(butene-1), ethylene/butene-1 random copolymers and other alpha-olefin polymers. Additional small amounts, i.e., up to about 3 weight percent based on the copolymeric constituent, of other polymers may also be present. Such polymers are the polymers of the monovinylidene aromatic compounds, e.g., styrene; the diolefins, e.g., 1,3-butadiene; and other monomers which can be polymerized in heterogeneous catalyst systems.

In one embodiment the copolymeric constituent contains as a first and essential ingredient a block copolymer of polyethylene and an ethylene/butene-1 copolymer and, as a second ingredient, an ethylene/butene-1 random copolymer. The copolymeric constituent of this embodiment may be prepared by a method comprising the steps of (1) polymerizing ethylene in the presence of a molecular weight control agent and a heterogeneous catalyst; (2) introducing butene-1 and ethylene into the resulting polymer slurry; and (3) subjecting the resulting mixture of polyethylene, ethylene and butene-1 to polymerizing conditions whereby ethylene/butene-1 copolymer block segments are formed on the pre-formed polyethylene block segments and a block copolymer is thereby obtained. Other copolymeric constituents are suitably prepared in a similar manner.

Other components which may be included in the polymeric blends of this invention in concentrations less than 10 weight percent based on the total blend include substances such as carbon black; antioxidants, e.g., 4,4'-thiobis - (6-tert-butyl -m-cresol), 2,6-di-tert-butyl-4-methylphenol; color concentrates; various polymeric materials and the like.

The novel jacketing blends of this invention have densities ranging from about 0.958 to about 0.957 and melt flow viscosities, as determined by ASTM D-1238-65T(E), in the range of from about 0.05 decigrams/minute to about 1.2 decigram/minute. The major component, high density, high molecular weight polyethylene, is present in the jacketing blend in concentrations ranging from about 60 weight percent to about 95 weight percent with the preferred concentrations being from about 70 to about 80 weight percent based on the blend. The minor component, the copolymeric constituent, is present in the blend in amounts from about 5 to about 40 weight percent based on the blend, preferably from about 20 to about 30 weight percent. It is desirable that the concentration of polymerized butene-1 in the jacketing blend be kept at or below about 5 weight percent, preferably within the range of from about 0.2 to about 1.2 weight percent, calculated as butene-1 based on the total jacketing blend. Jacketing blends having more than 5 weight percent of polymerized butene-1 on this basis do not usually exhibit any improvement over the properties of the blends containing less than 5 weight percent of polymerized butene-1.

While it is possible to prepare the blends of this invention by mechanically mixing the required components in a dry state, these novel blends are preferably prepared by a novel two stage process wherein a suitable polyethylene product is prepared in the first stage, a suitable copolymeric product is prepared in the second stage, and the resulting products (each in the form of a polymer slurry) of the two stages are finally admixed.

In one preferred embodiment, the jacketing blend is prepared by a two stage process, not a part of this invention, wherein the first stage involves the polymerization of ethylene under conditions normally used in heterogeneous catalyst systems until the resulting polymer slurry contains from about 5 to about 40 weight percent polymer solids followed by the removal of a major portion of the polymer from the polymerization zone, and the second stage involves feeding butene-1 and ethylene into the polymerization zone containing the remaining portion of the polyethylene, subjecting the mixture to polymerization conditions until the amount of polymerized butene-1 ranges from about 0.05 to about 5 weight percent and the amount of polymerized ethylene ranges from about 0.05 to about 15 weight percent based on the amount of ethylene polymerized in the first stage, and then combining the components derived from the two stages.

Heterogeneous catalysts which are employed in methods for preparing the jacketing blend components separately or in the two stage process are readily obtained by mixing an alkyl aluminum with a reducible compound of a metal of Groups IV-A, V-A, VI-A, and VIII of the Periodic Chart. Examples of alkyl aluminum compounds which may be used include trimethyl aluminum, triethyl aluminum, triisobutyl aluminum, tri-n-butyl aluminum, tri-n-pentyl aluminum, diethyl aluminum chloride, diethyl aluminum hydride and the like. Metals of the above-listed groups include titanium, zirconium, hafnium, thorium, uranium, vanadium, columbium, tantalum, chromium, molybdenum, tungsten and iron. Examples of suitable reducible compounds of these metals include halides, e.g., chlorides and bromides; oxyhalides, e.g., oxychlorides; complex halides, e.g., complex fluorides; freshly precipitated oxides or hydroxides; and organic compounds, e.g., alcoholates, acetates, benzoates, or acetyl acetonates. Titanium compounds are preferred, for example, titanium tetrachloride, titanium oxychloride or titanium acetyl acetonate. An especially preferred heterogeneous catalyst is a mixture of triisobutyl aluminum and titanium tetrachloride. Such catalyst systems are prepared by dissolving each of the ctalyst components in an inert liquid vehicle such as hexane under an oxygen- and moisture-free atmosphere, e.g., nitrogen, argon, helium and the like. Actual procedures for preparing these catalyst systems are described in more detail in U.S. Pats. 3,113,115 and 3,257,332 of Karl Ziegler et al.

Like most heterogeneous catalyst processes, the two stage process is carried out in the absence of molecular oxygen, carbon monoxide, carbon dioxide and water in a conventional reaction vessel which permits bubbling of the ethylene or butene-1 gas through the inert vehicle which contains the catalyst. The polymerization of both stages is conducted at temperatures in the range of from about 30° C. to about 100° C. and preferably from about 85° C. to about 95° C. For convenience of handling the gaseous alpha-olefins the polymerization zone is maintained under a pressure between atmospheric and about 115 pounds per square inch gauge (p.s.i.g.) for the first stage, preferably at a pressure in the range of from about 55 to about 65 p.s.i.g. In the second stage it is desirable to maintain the zone under a pressure from about 10 p.s.i.g. to about 200 p.s.i.g. In a preferred embodiment the first stage is carried out in the presence of a molecular weight control agent such as hydrogen, acetylene, and other commonly employed chain transfer agents. If hydrogen is used as the molecular weight control agent, the amount of hydrogen employed ranges from about 1 to about 90 mole percent based on the ethylene feed, and preferably from about 25 to about 50 mole percent.

However, it is preferred that the molecular weight control agent not be present during polymerization of the second stage.

The two stage process may be carried out in a batchwise or continuous manner. When the process is a continuous one in which the first stage is carried out in the presence of a molecular weight control agent, the remaining portion of the polymer slurry is passed to a second polymerization reactor where the butene-1 or butene-1 and alpha-olefin can be introduced in the absence of the molecular weight control agent.

Upon completion of polymerization in the second stage, any excess monomer is vented and the contents of the reactor are passed to a digestion zone wherein the polymerization mixture is admixed with the major portion of the polyethylene slurry. The mixture is then treated by any conventional method to deactivate the catalyst and remove the catalyst residues and recover the polymer mixture. In one method, deactivation of the catalyst is accomplished by washing the slurry mixture with an alcohol such as methanol, n-propanol, isopropanol and the like. The polymer is then separated from the diluent, e.g., by decantation, filtration or other similar method, after which the polymer is dried.

The jacketing blend, thus prepared, is preferably coated to a metallic conductor or to a metallic conductor coated with an insulative material by the continuous extrusion of the heat plastified blend to the metallic conductor as it is pulled through an extrusion head or other similar shaping means. An example of a suitable conductor coating means is described fully in U.S. Pat. 3,121,255. Other conventional wire coating means are also suitable for the purposes of this invention.

has a melt index of 4.1 decigrams/minute as determined by ASTM D-1238-65T(E). The remaining 1 part of catalytically active polyethylene slurry is transferred to a second reactor which is purged with nitrogen. Ethylene and butene-1 are then introduced into the second reactor, ethylene in the form of a gas at a rate of 3.0 to 5.0 pounds per hour and butene-1 in the form of a 20 mole percent solution in hexane at a rate of 0.28 pounds per hour. The polymerization of butene-1, active polyethylene, and ethylene is conducted at 55° to 60° C. and 35 p.s.i.g. pressure. No hydrogen is introduced into the second reactor. The resulting slurry of a block copolymer of polyethylene and ethylene/butene-1 copolymer and a random copolymer of ethylene and butene-1 is passed into the digestor containing the 3 parts of the polyethylene slurry from the first reactor. The polymer slurries are admixed and the catalyst is solubilized by steaming the slurry at 96° C. for 60 minutes. The combined slurry is then cooled to 40° C., removed from the digestor and the vehicle separated from the resulting blend of polyethylene and the copolymeric constituent of (a) the block copolymer of polyethylene and ethylene/butene-1 copolymer and (b) the random copolymer of ethylene and butene-1. The recovered blend is dried in an air slide wherein air preheated to 123° C. is passed through the slide at a rate of 300 cubic feet per minute.

Portions of the jacketing blends having different concentrations of butene-1 and ethylene polymerized in the second reactor are molded and cut into test tabs (⅛" thick x ½" wide x 1½" long) at a cylinder temperature of 430° F. using a one ounce Watson Stillman Molding Machine. Results obtained from testing such tabs are shown in the following Table I.

TABLE I

| Example Number | Percent ethylene polymerized [1] | Percent butene-1 polymerized [2] | Blends of the invention | | | | |
|---|---|---|---|---|---|---|---|
| | | | Density [3] | Flexural modulus [4] | Melt flow viscosity [5] | TSCR [6] | $F_{50}$ [7] |
| 1 | 11 | .6 | .963 | 212,000 | .62 | 0/9/336 | 56 |
| 2 | 8.3 | .47 | .962 | 239,000 | .44 | 0/9/336 | 161 |
| 3 | 6 | .5 | .960 | 200,000 | .16 | 0/9/336 | 500 |

[1] Weight percent based on ethylene polymerized in the first reactor of ethylene polymerized in the second reactor.
[2] Weight percent based on ethylene polymerized in the first reactor of butene-1 polymerized in the second reactor.
[3] Density in grams/cubic centimeter as determined by ASTM D-1505-63T.
[4] Flexural modulus in pounds/square inch as determined by ASTM D-790-63.
[5] Melt flow viscosity in decigrams/minute as determined by ASTM D-1238-65T(E).
[6] Thermal stress crack resistance in failures/number of specimens/hours as determined by test method described in REA, PE-200 (March 1965), paragraph 8.
[7] Stress crack resistance in number of hours at which 50 percent of the samples failed as determined by ASTM D-1693-60T.

The following examples are set forth as illustrations of the invention and are not to be construed as limiting its scope. Throughout this specification and claims, all parts and percentages are by weight unless otherwise indicated.

EXAMPLES 1–3

A jacketing blend is prepared by the following two stage process:

Seven milliliters of a 1 molar n-hexane solution of triisobutyl aluminum is added to 7 milliliters of a 1 molar n-hexane solution of titanium tetrachloride. The catalyst components are stirred 30 minutes at ambient temperature in an atmosphere of dry, oxygen-free nitrogen, forming a slurry of solid catalyst in the hexane. The catalyst slurry is then introduced by nitrogen pressure into a stirred reactor which had been previously kept under nitrogen pressure, containing two liters of dry, oxygen-free n-hexane. A mixture of hydrogen and ethylene gas is then passed into the bottom of the reactor at a pressure of 60 p.s.i.g. and a temperature of 88° C. to 90° C. The amount of hydrogen is 65 mole percent based on the ethylene feed of 60 pounds per hour. When the polymer solids of the resulting polymer slurry reaches about 30 weight percent, approximately 3 of 4 total parts of the polyethylene slurry is transferred directly into a digestor containing isopropyl alcohol. The resulting polyethylene

EXAMPLE 4

A 90 gram-portion of a jacketing blend prepared according to Example 1 and 10 grams of a polyethylene concentrate containing 26 weight percent of carbon black, 0.5 weight percent of an antioxidant, and 73.5 weight percent of a polyethylene having a melt index of 0.5 decigram/minute and density of 0.92 are mixed together on a Banbury mixer. The resulting mixture is molded into test tabs and tested according to procedures described in Example 1. No failures are observed when the test tabs are subjected to thermal stress crack conditions of Example 1 for 336 hours. The resulting mixture meets all other standards set out by the Rural Electrification Arministration in REA Specification for Polyethylene Raw Material, PE-200 (March 1965).

EXAMPLE 5

A sample of a jacketing blend prepared according to Example 1 is extruded onto a metallic cable core by a continuous extrusion process. The resulting cable jacketing exhibited the excellent properties shown by the blends of Example 1 when subject to similar testing conditions.

EXAMPLES 6–9

Examples 6–9 are conducted in accordance with the process of the present invention by the following procedure.

Seven milliliters of a 1 molar n-hexane solution of triisobutyl aluminum is added to 7 milliliters of a 1 molar n-hexane solution of titanium tetrachloride. The catalyst components are stirred 30 minutes at ambient temperatures in an atmosphere of dry, oxygen-free nitrogen, forming a slurry of solid catalyst in the hexane. The catalyst slurry is then introduced by nitrogen pressure into a stirred reactor which had been previously kept under nitrogen pressure, containing two liters of dry, oxygen-free n-hexane.

A mixture of hydrogen and ethylene gas is passed into the bottom of the reactor at a pressure of 60 p.s.i.g. and a temperature of 88° to 90° C. The amount of hydrogen is 50 mole percent based on the ethylene feed. When the polymer solids in the resulting polymer slurry reaches about 30 percent by weight, approximately 3 of 4 total parts of the polymer slurry is transferred directly into a digestor containing isopropyl alcohol. The remaining 1 part of live polymer slurry is transferred to a second reactor wherein butene-1 is introduced into the polymer slurry. The polymerization of butene-1 is conducted at 45° to 55° C. and 40 p.s.i.g. pressure. No hydrogen is introduced into the second reactor. In different runs the amount of butene-1 polymerized is varied from 0.2 percent by weight based on the amount of ethylene polymerized in the first reactor to 1.2 percent by weight. After the required amount of butene-1 is polymerized, the polymer slurry is passed to the digestor containing the 3 parts of the polyethylene slurry from the first reactor. The polymer slurries are admixed and the catalyst is solubilized by heating the slurry at 85° C. for 60 minutes. The combined slurry is then cooled to 40° C., removed from the digestor and the vehicle and polymer separated by centrifugation. The recovered polymer composition is dried at 100° C. under reduced pressure in a nitrogen atmosphere.

Portions of the polymer compositions, which are essentially blends of polyethylene and a block copolymer of polyethylene and poly(butene-1) are molded and cut into test tabs according to the method of Example I.

The resistance of test tabs of the polymer composition to stress cracking is determined according to ASTM D-1693-60T using a condensate of p-nonylphenol and 9 moles of ethylene oxide. Stress crack resistance is represented by the symbol $F_{50}$ and is reported as the time in hours at which 50 percent of the samples failed according to the ASTM test.

The stress crack resistance of the molded polymer samples as well as their physical properties are summarized in Table II below.

TABLE II

| Example Number | Percent polymerized butene-1 in blend | Melt flow viscosity [1] | Density [2] | $F_{50}$ [3] |
|---|---|---|---|---|
| 6 | 0.2 | 0.6 | 0.97 | 48 |
| 7 | 0.2 | 0.4 | 0.96 | 93 |
| 8 | 0.7 | 0.1 | [4] ND | 500 |
| 9 | 1.2 | 0.05 | 0.96 | 500 |

[1] Melt flow viscosity in decigrams/minute as determined by ASTM D-1238-65T(E).
[2] Density in grams/cubic centimeter as determined by ASTM D-1505-63T.
[3] Stress crack resistance in numbers of hours at which 50 percent of the samples failed as determined by ASTM D-1693-60T.
[4] ND means not determined.

What is claimed is:

1. In an electrical cable having a metallic core and a jacket comprising a polymeric blend, the improvement wherein the blend has density from about 0.958 to about 0.975 and melt flow viscosity from about 0.05 to 1.2 decigrams per minute and comprises (1) from about 60 weight percent to about 95 weight percent of high density, high molecular weight polyethylene having density in the range of from about 0.96 to about 0.98 and melt index in the range of from about 0.1 decigram per minute to about 10.0 decigrams per minute and (2) from about 5 weight percent to about 40 weight percent of a high molecular weight copolymeric constituent containing as an essential ingredient a block copolymer of (a) polyethylene and (b) a polymer of butene-1, said copolymeric constituent containing from about 60 weight percent to about 99.75 weight percent of polymerized ethylene and from about 0.25 weight percent to about 40 weight percent of polymerized butene-1 based on the copolymeric constituent, said constituent having density from about 0.92 to about 0.93 and melt flow viscosity from about 0.005 decigram per minute to about 0.4 decigram per minute.

2. The improvement according to claim 1 wherein the polymeric blend comprises (1) from about 70 weight percent to about 80 weight percent of the high density, high molecular weight polyethylene and (2) from about 20 weight percent to about 30 weight percent of the copolymeric constituent containing from about 60 weight percent to about 99.75 weight percent of polymerized ethylene and from about 0.25 weight percent to about 40 weight percent of polymerized butene-1, but wherein butene-1 is present in amounts not greater than 5 weight percent based on the total polymeric blend.

3. The improvement according to claim 2 wherein butene-1 is present in concentrations ranging from about 0.2 to about 1.2 weight percent based on the total polymeric blend.

4. In an electrical cable having a metallic core and a jacket comprising a polymeric blend, the improvement wherein the blend has density from about 0.958 to about 0.975 and melt flow viscosity from about 0.05 to 1.2 decigrams per minute and comprises (1) from about 60 weight percent to about 95 weight percent of high density, high molecular weight polyethylene having density in the range of from about 0.96 to about 0.98 and melt index in the range of from about 0.1 decigram per minute to about 10.0 decigrams per minute and (2) from about 5 weight percent to about 40 weight percent of a high molecular weight copolymeric constituent containing as an essential ingredient a block copolymer of polyethylene and ethylene/butene-1 copolymer, said ethylene/butene-1 copolymer containing from about 60 weight percent to about 99.75 weight percent of polymerized ethylene and from about 0.25 weight percent to about 40 weight percent of polymerized butene-1 based on the copolymer constituent, said constituent having density from about 0.92 to about 0.93 and melt flow viscosity from about 0.005 decigram per minute to about 0.4 decigram per minute.

5. The improvement according to claim 4 wherein the copolymeric constituent contains as a second ingredient an ethylene/butene-1 copolymer.

References Cited

UNITED STATES PATENTS

| 3,176,052 | 3/1965 | Peticolas | 260—897 A |
| 3,256,366 | 6/1966 | Corbelli | 260—897 A |
| 3,280,220 | 10/1966 | Nelson | 260—897 A |
| 3,475,369 | 10/1969 | Blunt | 260—878 B |

ROBERT F. BURNETT, Primary Examiner

L. M. CARLIN, Assistant Examiner

U.S. Cl. X.R.

117—128.4, 161 R; 174—110 SR; 260—897 A

UNITED STATES PATENT OFFICE
CERTIFICATE OF CORRECTION

Patent No. 3,649,441   Dated 14 March 1972

Inventor(s) Carl P. Strange and Gordon Y. T. Liu

It is certified that error appears in the above-identified patent and that said Letters Patent are hereby corrected as shown below:

Column 3, line 8, delete "copolymers) of polyethylene and poly(butene-1)," and insert --copolymer) includes the homopolymers of butene-1--.

line 17, change "polymer" to --polymers--.

line 50, change "0.957" to --0.975--.

Column 4, line 46, delete "ctalyst" and insert --catalyst--.

Column 6, line 61, delete "Arministra-" and insert -- Administra- --.

Signed and sealed this 26th day of September 1972.

(SEAL)
Attest:

EDWARD M. FLETCHER, JR.
Attesting Officer

ROBERT GOTTSCHALK
Commissioner of Patents